United States Patent

[11] 3,604,813

| [72] | Inventors | Gerrit Hendrik Te Kronnie; Karel Hero Volkers, both of Van Breestraat 171, Amsterdam, Netherlands |
|---|---|---|
| [21] | Appl. No. | 879,836 |
| [22] | Filed | Nov. 25, 1969 |
| [45] | Patented | Sept. 14, 1971 |
| [32] | Priority | Nov. 28, 1968 |
| [33] | | Netherlands |
| [31] | | 6817007 |

[54] POSITION-INDICATING INSTRUMENT
12 Claims, 15 Drawing Figs.

[52] U.S. Cl.................................................... 356/172, 356/170
[51] Int. Cl..................................................... G01b 11/26
[50] Field of Search............................................ 356/153, 169, 170, 172; 350/162

[56] References Cited
UNITED STATES PATENTS

| 2,390,122 | 12/1945 | Powers.......................... | 356/169 |
| 2,451,972 | 10/1948 | Powers.......................... | 356/169 |

*Primary Examiner*—Ronald L. Wibert
*Assistant Examiner*—J. Rothenberg
*Attorney*—Arthur B. Colvin ABSTRACT: Moire instrument enabling a distant observer to locate a point into an optical plane of reference established by the instrument. The instrument has two line grids positioned in intersecting planes. For good visibility of the moire patterns certain specific conditions concerning the pitch of the grids and their separation have to be met. In order to maintain a sufficient working range, the pitch of the foremost grid may be made slightly larger than that of the rearmost grid.

PATENTED SEP 14 1971 3,604,813

INVENTORS
GERRIT HENDRIK TE KRONNIE
KAREL HERO VOLKERS
BY

ATTORNEY

PATENTED SEP 14 1971 3,604,813
SHEET 5 OF 5
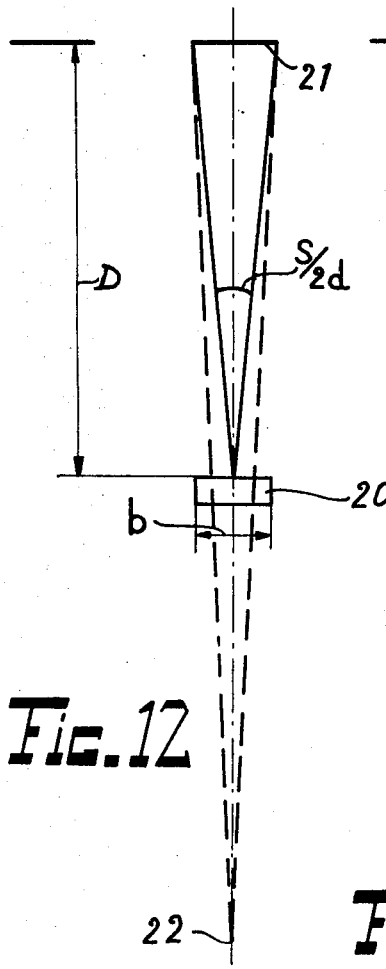
Fig.12
Fig.13
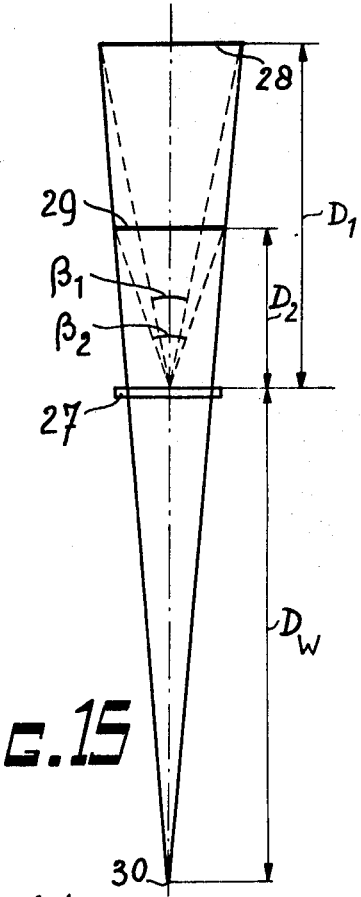
Fig.15
Fig.14
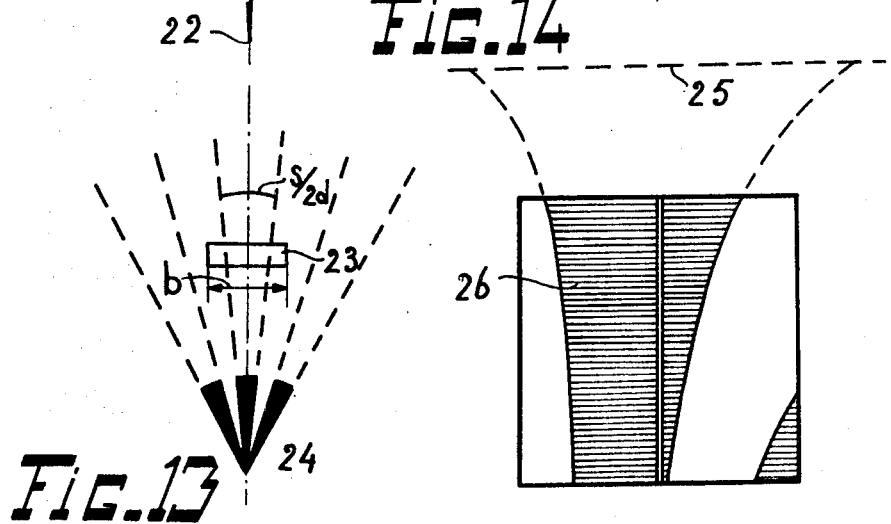
INVENTORS
GERRIT HENDRIK TE KRONNIE
KAREL HERO VOLKERS
BY
ATTORNEY

POSITION-INDICATING INSTRUMENT

This invention relates to an instrument for rendering to a distant observer a visual indication of the position of a point relative to a plane of reference established by the instrument, more particularly for the purpose of locating such point into the plane or reference. Instruments of this type may find useful application with various kinds of work, such as leveling terrains, installing pipelines and cables, marking the fairway of shipping channels, erecting walls and the like, and, generally, in all cases where the position of objects relative to horizontal, vertical or inclined planes must be controlled in a simple yet precise manner.

The invention utilizes a well-known optical phenomenon, hereinafter referred to as "moire-effect," which may be achieved by placing two mutually similar line grids one behind the other at some mutual distance, such that the rearmost grid is seen through the foremost one. The grids will then generally form phantom or superposition patterns of alternating dark and light zones or bars having a much coarser structure than the line grids themselves so that these bars can be clearly distinguished at long distances. Generally, these moire patterns will change in appearance when varying the place from which they are observed. For instance, the number of moire bars seen through the foremost grid will normally decrease when the observer moves away from the grids. It has already been proposed to utilize this last-mentioned phenomenon for the purpose of estimating the distance from an observer to an instrument comprising two such line grids. Moreover, it has been observed that if the grids are positioned in planes intersecting each other along a line generally perpendicular to the grid lines, the moire pattern will not only depend upon the distance but also upon the direction from which the observer views the instrument.

If, e.g. the observer has his eye in the center-perpendicular plane of the foremost grid parallel to the grid lines, he will see a straight bar in the center of the moire pattern which bar is parallel to the grid lines. If he moves a certain distance out of that plane, however, the moire pattern will only comprise curved bars which will be inclined one way or the other with respect to the grid lines.

In designing instruments based on this principle (hereinafter to be called planoscopes) certain problems are encountered in relation to the necessity of assuring a good visibility of the moire patterns over the complete useful grid area. More specifically, it has appeared that various parameters defining the planoscope, such as the pitch of the line grids, the average distance between the grids and the angle comprised between the grid planes, cannot be chosen at random.

The invention starts from an instrument for rendering to a distant observer a visual indication of the position of a point relative to a plane of reference established by the instrument, which instrument comprises two line grids positioned in intersection planes perpendicular to the plane of reference, which grids are symmetrical with respect to the plane of reference and both have lines which are substantially parallel to the plane of reference. It is the principal object of the invention to define certain conditions which have to be satisfied in order to avoid the above indicated problems and provide a useful planoscope.

In accordance with the invention the pitch of the line grids is so selected and the grids are so positioned relative to each other that either the condition I:

$$\frac{d_{max.}}{s^2} < \frac{0.45}{\lambda_m} \qquad (I)$$

or the set of conditions II:

$$\frac{d_{max.}}{s^2} < \frac{n+0.45}{\lambda_m}$$

$$\frac{d_{min.}}{s^2} > \frac{n-0.15}{\lambda_m} \qquad (II)$$

satisfied, in which:

$d_{max}$ = the maximum distance between the grids taken in the direction perpendicular to the bisector plane of the grids;

$d_{min}$ = the minimum distance between the grids taken in the same direction;

$n$ = an integer, greater than zero;

$s$ = the pitch of the grids; and $\lambda_m$ = the mean wavelength of the light used.

Preferably, in the planoscope according to the invention, one of the following conditions III or IV is satisfied in addition to the condition I or II, respectively: in which:

$$\frac{d_m}{s^2} < \frac{0.15}{\lambda_m} \qquad (III)$$

$$\frac{n-0.05}{\lambda_m} < \frac{d_m}{s^2} < \frac{n+0.20}{\lambda_m} \qquad (IV)$$

$d_m$ = the average distance between the grids measured in the direction perpendicular to the bisector plane of the grids.

According to a further preferred characteristic of the invention, the pitch of the foremost grid is made slightly greater than that of the rearmost grid, preferably such that the difference in pitch is between 1/2000 and 1/100 of the average value of the pitches of the grids.

These and other characteristics of the invention will become clear when reading the following description, in connection with the drawings in which:

FIGS. 12 and 13 are two optical diagrams of planoscopes, used to explain certain differences in performance;

FIG. 14 is a moire pattern as rendered by a planoscope according to FIG. 11; and FIG. 15 is an optical diagram of another type of planoscope according to the invention.

Figure 1:
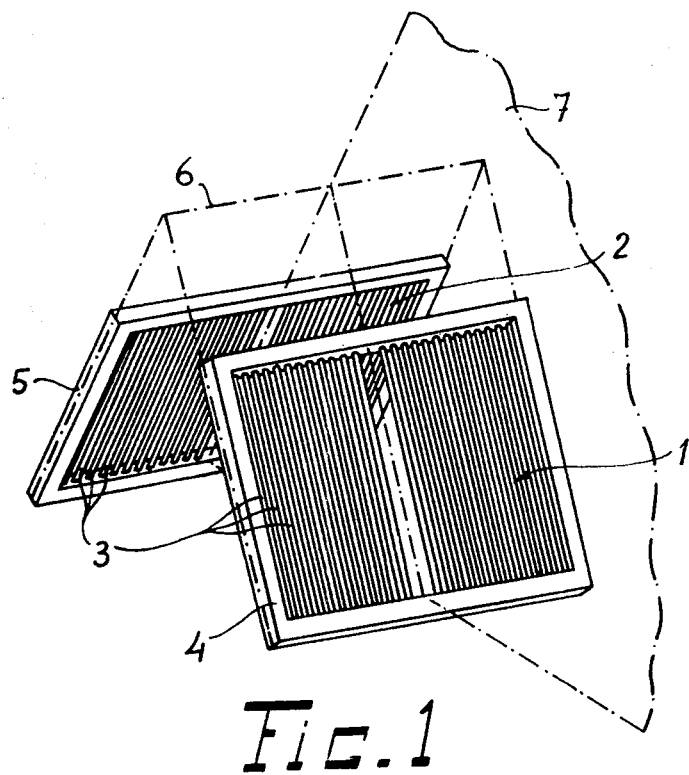
FIG. 1 is a diagrammatic perspective view of a planoscope.

The two line grids of the planoscope shown in FIG. 1 are designated 1 and 2. In this case they consist of mutually parallel opaque bars 3 of circular cross section and equal diameter which are mounted in frames 4 and 5 at mutual distances substantially equal to the diameter. It will be understood, however, that the invention is not restricted to any particular form of grid.

The frames 4 and 5 are positioned at an angle with respect to each other, such that the line of intersection 6 of the planes in which the grids lie is perpendicular to the bars 3. The common center-perpendicular plane 7 of the grids 1 and 2 is the plane of reference created by the planoscope. In order to have a visual indication of that plane in the image observed one or more bars 3 have been omitted from each grid at the places where the reference plane intersects the grids.

Figure 2:
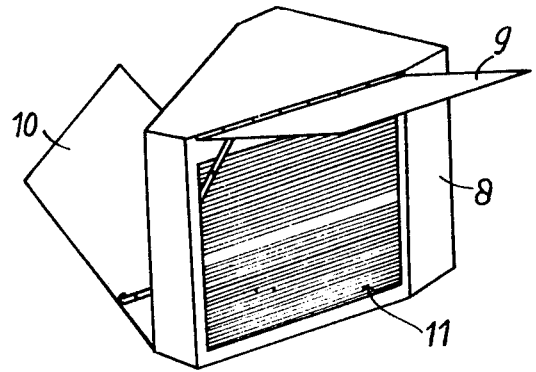
FIG. 2 is a perspective view of a further planoscope.

FIG. 2 shows an example of a complete planoscope with a horizontal reference plane. It has a prismatic housing 8 with a front lid 9 hinged along its upper edge and a rear lid 10 hinged along the lower edge. In use, the instrument will normally be placed on a tripod (not shown). The rear lid 10 may be provided with a diffuse reflective coating to assure a good contrast of the background with the grids. The front lid 9 serves as a screen against false light which might cause disturbing reflections at the foremost grid. If desired, all kinds of auxiliary equipment for leveling and sighting etc. may be mounted on the planoscope housing, but these are not shown in the drawing.

Figure 3:
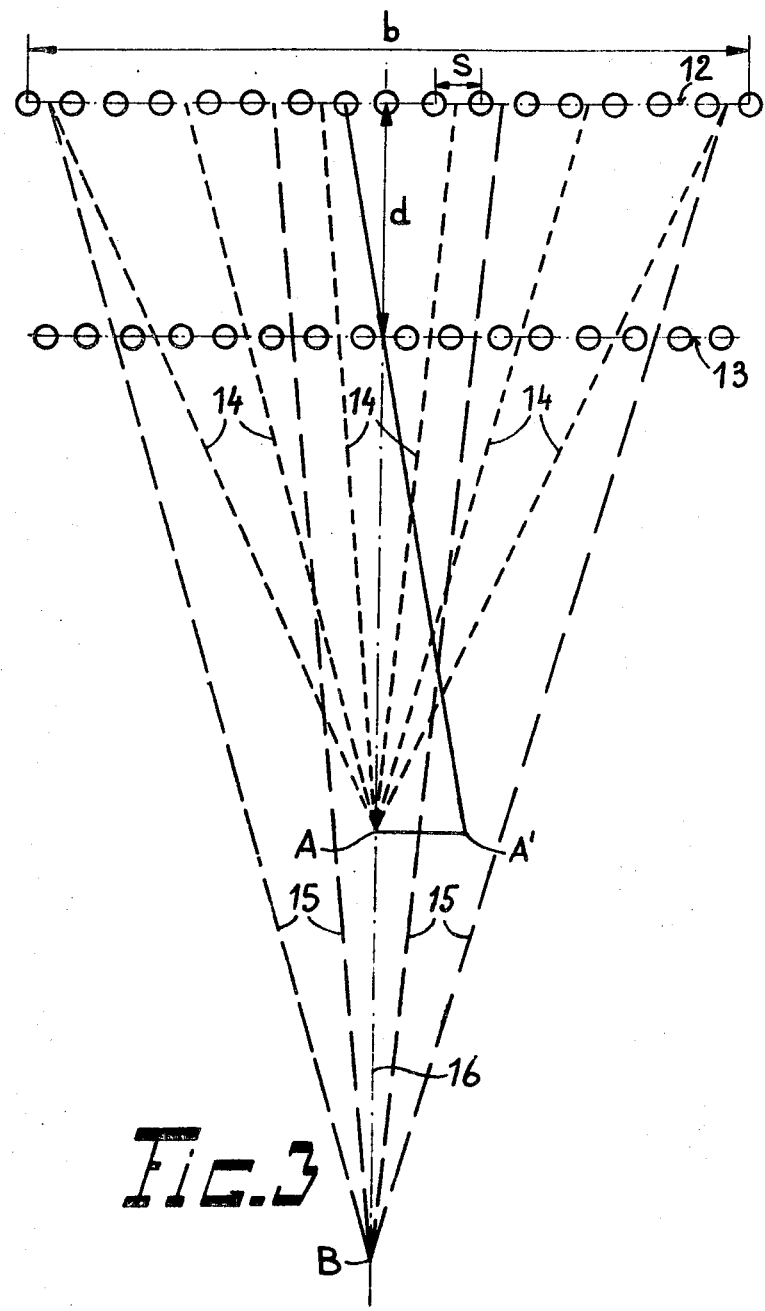
FIG. 3 is a cross-sectional view of a pair of grids used to discuss the formation of moire patterns.

To facilitate an understanding of the invention, a short explanation will first be given of the forming of moire patterns by two separated grids. To that end it will be assumed that the mutual distances of the grid lines in the two grids are equal (equal pitches) and that the grids are lying in mutually parallel planes. FIG. 3 shows such grids 12 and 13 in cross section, it being understood that for clarity the pitch S has been largely exaggerated in comparison with the mutual distance $d$ of the grids. The grids have a phase shift of a half period relative to each other, i.e. opposite each bar of the foremost grid there is a slit in the rearmost grid and vice versa. If we now consider what kind of pattern is offered to a distant observer having his eye in the plane of reference 16, this appears to be one of alternating dark and light zones or bars parallel to the grid lines and of substantially equal width, the center bar being a dark one. It will be seen furthermore that the apparent width of the bars, i.e. the visual angle subtended by each bar, does not charge when the observer moves away from the planoscope.

Of course, these bars have no sharp boundaries; there is a progressive change from the center of a dark bar where the slits of one grid are completely covered by the bars of the other grid, to the center of the adjacent light bar, where the slits are virtually coincident. If, however, for ease of explanation, it is assumed that the separation between the dark and light moire bars lies at equal distances from the centers mentioned, at 25 percent light transmission that is, it can be easily derived from FIG. 3 that each bar has an angular width of $s/2d$ (provided that the observer's distance $D$ is long in comparison with the grid separation $d$) and that this width is independent from the observer's distance. In FIG. 3 lines 14 and 15 indicate for two positions A and B, respectively, in which directions the centers of light moire bars are seen. Since, obviously, the visual angle subtended by the width $b$ of the planoscope is inversely proportional to the distance $D$ the number of moire bars seen within the field of the planoscope will decrease as well. Whereas in position A a total of six light bars can be observed, this number is reduced to four in position B. If the observer now moves out of the reference plane, e.g. in FIG. 3 to the position A', then he will see the bars moving in the same direction, so that the moire pattern becomes unsymmetrical. Arriving at position A', that is to say with an angular deviation of $s/d$, the whole pattern will have moved precisely one period so that the same symmetry is obtained as in the reference plane. This explains why it is disadvantageous to position the grids in mutually parallel planes, because, generally, the observer will not be able to distinguish between the first and second case mentioned. In other words, a correct identification of the center band is not readily possible with the configuration shown in FIG. 3, and it is necessary therefore to position the grids in intersecting planes as shown in FIG. 1.

Figure 4:
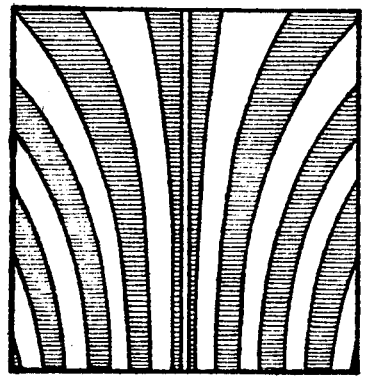
FIGS. 4–6 are three moire patterns, as seen in the plane of reference, at various distances.
Figure 5:
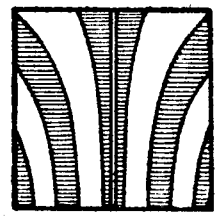
Figure 6:

This results in the distance $d$ between the grids becoming a variable dependent on place. As shown above, then also the apparent width of the moire bars will vary over the grid surface, from a certain minimum value $s/2d_{max}$ at the lower edge to a maximum value $s/2d_{min}$ at the top. The apparent transitions from the light to the dark bars will be hyperbolic in shape, as diagrammatically shown in the FIGS. 4, 5 and 6. These figures are illustrative for the moire patterns which would be seen in the positions A, B and a further position, not shown in FIG. 3, at a still longer distance, respectively, if the grids 12, 13 are placed at an angle. All bars in these patterns have a specific shape which is symmetrical only for the center bar. Thereby the latter can easily be identified.

Figure 7:
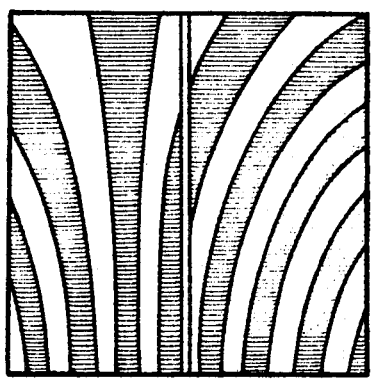
FIGS. 7–9 are three moire patterns as seen outside the reference plane.
Figure 8:
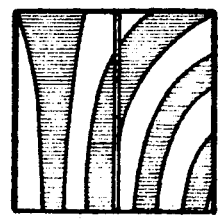
Figure 9:

The FIGS. 7, 8 and 9 show the moire patterns resulting from the configuration discussed (equal pitch, grids positioned at an angle) at the same distances, if the observer stands an angle $s/d$ out of the reference plane ($d$ means in this case the average distance between the grids). These patterns illustrate clearly that the observe can conclude from the asymmetry of the patterns that he is not in the reference plane.

From the above it will be seen that the accuracy of the planoscope is in fact determined by the ratio $s/d$ ($d$, again, being the average grid distance). The smaller the angular deviation at which the resultant asymmetry can first be detected, the higher the accuracy. This minimum detectable deviation has a fixed ratio to the angle $s/d$ which causes a shift of the moire pattern through a whole period. In practice, that ratio can be assumed to be 1/150, so that the standard error is $1/150 \times s/d$.

Thus, in the interest of accuracy $s/d$ should be as small as possible, which calls for very fine grids at a relative long average mutual distance. There is however a practical limit to that. As shown above the angle $s/d$ is in fact the apparent width of the moire bars. Thus, a very low value $s/d$ means at the same time a very fine moire pattern which is more difficult to observe due to the limited resolving power of the eye. Therefore, a value for $s/d$ or 1/500 should be considered as optimal. Obviously, however, for instruments solely intended for use in combination with telescopes, this ratio could be decreased in accordance with the angular magnification of the telescope.

Experiments have now shown that, in selecting proper values for $s$ and $d$, not only the required accuracy should be taken into account, but also a further phenomenon, i.e. loss of contrast in the moire pattern caused by light diffraction. More specifically, it could be established that a selection of $s$ and $d$ such that the quantity $d/s^2$ lies in certain unfavorable zones would result in serious loss of contrast in the resulting moire pattern, such that the individual bars can no longer be distinguished. Thus, with increasing $d/s^2$, subsequent regions with good or reasonable contrast appear to be separated by regions in which contrast is extremely poor. The subsequent favorable regions will be termed hereinafter "zero order," "first order," "second order," etc. As could be expected from a light diffraction effect, the wavelength $\lambda$ of the light used has an influence on the position of the useful regions. The contrast function appears to have maxima in the zero and higher order regions where $$\frac{d}{s^2} = \frac{n+v}{\lambda}$$

in which $n$ is the order number and $v$ is a number in the order of 0.1 to 0.15.

As set forth hereinbefore, it is desirable in order to facilitate the identification of the center moire bar to position the grids at an angle which is not too small. Consequently, the value $d/s^2$ will vary over the grid surface from a minimum to a maximum. Accordingly, these values have to be chosen so that a sufficient contrast is achieved over the whole grid area. Moreover, the planoscope will generally not be used with monochromatic light but in daylight or with an artificial light source producing a more or less broad spectrum of wavelengths. In that case, adjacent to the favorable regions producing "while" moire bars with good contrast, other zones will occur in which the moire bars, though more or less colored, are still readily distinguishable. Thus, the use of while light results in a certain widening of the useful regions compared with the monochromatic case.

Accordingly, the pitch and the position of the grids relative to each other should be chosen so that, for a zero order planoscope:

$$\frac{d_{max.}}{s^2} < \frac{0.45}{\lambda_m}$$

or, for an $n^{th}$ order planoscope:

$$\frac{d_{min.}}{s^2} > \frac{n-0.15}{\lambda_m}$$

$$\frac{d_{max.}}{s^2} < \frac{n+0.45}{\lambda_m}$$

in which:

$d_{max}$ = the maximum distance between the grids taken in the direction perpendicular to the bisector plane of the grids;

$d_{min}$ = the minimum distance between the grids taken in the same direction;

$n$ = an integer, greater than zero;

$s$ = the pitch of the grids; and $\lambda_m$ = the mean wavelength of the light used.

If the planoscope is not provided with a light source of its own having a known spectrum $\lambda_m$ in these formulas should be taken as the mean wavelength of the visible spectrum ($\lambda_m$= $5.8\times10^4$mm.).

Preferably, the planoscope is furthermore so designed that, for the means wavelength $\lambda_m$ of the light used and the average distance $d_m$ between the grids, the best possible contrast will be achieved. To that end, for a zero order planoscope, the condition:

$$\frac{d_m}{s^2} < \frac{0.15}{\lambda_m},$$

and, for an $n^{th}$ order planoscope, the condition:

$$\frac{n-0.05}{\lambda_m} < \frac{d_m}{s^2} < \frac{n+0.20}{\lambda_m}$$

should be satisfied.

From the above it follows that a planoscope working in the zero order region and having optimum accuracy can only be designed if there are no objections against rather large dimensions. As we have seen, a ratio $s/d=1/500$ should be considered as optimum. On that basis, only distances between the two grids in the order of 1 meter may put the configuration sufficiently far into the zero order region where the contrast is best. For a planoscope of more practical dimensions, e.g. in the order of 30 cm., somewhat less accuracy must be accepted.

A better possibility to obtain optimum accuracy is offered by the first order region. However, in order to remain safely within that region, with a given pitch $s$ only a relatively small variation of $d$ can be applied. This means, on one hand, that the ratio $d_{max}/d_{min}$ must remain relatively small, so that it may become difficult to satisfy the minimum requirements posed by the identification of the center moire bar. On the other hand the useful field angle of the planoscope will be inevitably smaller. That angle is defined as the angle in the reference plane, measured from the instrument, within which the moire pattern can be observed clearly. For horizontal planoscopes a wide field angle is normally an essential requirement, for vertical planoscopes this is generally less important. It will be clear that with variations of the angle from which the planoscope is observed, the effective distance between the grids also changes. Consequently, the useful field angle is limited by the fact that for a good visibility the value of $d/s^2$ has to remain within the first order region. For the same reason, second or higher order planoscopes having even smaller latitudes for $d$, will be found unsuitable in many cases.

In conclusion it can be said that the zero region is best suitable for planoscopes with wide angular field for which large dimensions are not objectionable, or which do not have to meet the highest demands as to accuracy. On the other hand the first order region offers the best prospects for planoscopes with a relatively narrow field, small dimensions and/or highest accuracy.

Figure 10:
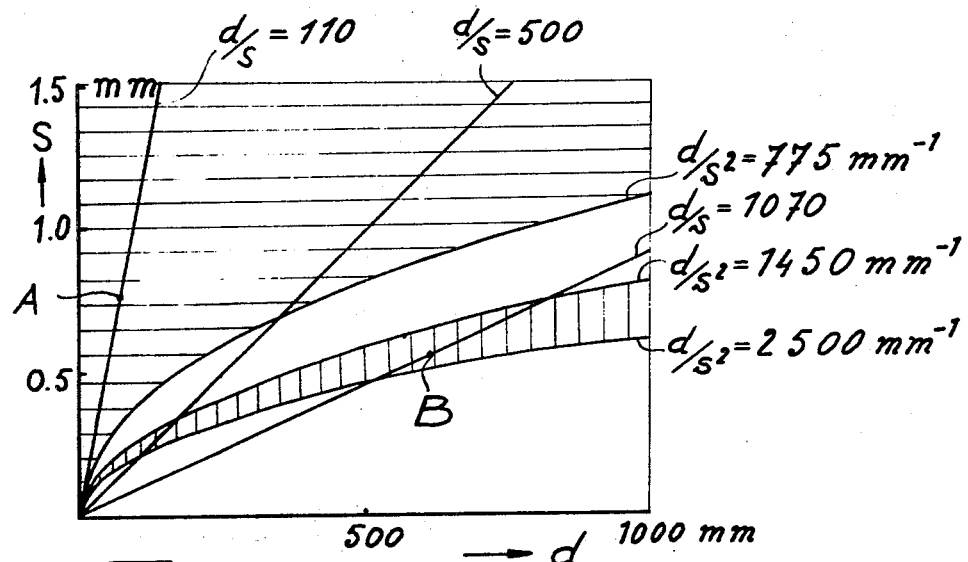
FIG. 10 is a diagram used in designing planoscopes in accordance with the present invention.

To illustrate the above relationships, in FIG. 10 an $s$–$d$ diagram is given showing the regions available for planoscopes according to the invention with a mean wavelength $\lambda_m$= $5.8\times10^4$mm. The zero order region (horizontal shading) is bounding on one side by the $s$-axis on the other side by the parabola $d/s^2=775$ mm.[11]. The first order region (vertical shading) lies between the parabolas $d/s^2=1450$ mm.[11] and $d/s^2=2500$ mm.[11]. In addition some straight lines through the origin representing different ratios $d/s$ have been drawn. Two typical planoscopes in the zero and first order region, respectively, are represented in the diagram by points A and B. Type B, owing to its extremely fine moire pattern, renders a very high precision but is suitable only for telescopic observation. The main characteristics of both types are as follows:

| | order | $d_m$ | $s$ | grid size | relative accuracy |
|---|---|---|---|---|---|
| Type A | 0 | 80 mm. | 0.73 mm. | 300×300 mm.1:16,000 | |
| Type B | 1 | 600 mm. | 0.56 mm. | 900×900 mm.1:160,000 | |

As discussed above, in a number of cases the contrast requirements may force the designer to adopt a relatively small ratio $d/s$. This means that the accuracy will be less than optimal. It means also that for a given size of the grids a severe limitation is introduced with respect to the maximum distance at which the instrument can be used. This can be seen as follows.

The moire pattern could be considered as optimal when it consists of one single bar covering about half the width of the grid. This is the pattern shown in FIG. 6. With this in mind the maximum observation distance may be said to be in the order of $500\times b$ ($b$ = the width of the planoscope) for observation with the naked eye; if a telescope is used this distance may be multiplied with the magnification. At that distance the foremost grid subtends a visual angle of 1/500, that is about 6 times the resolving power of the eye. In the above optimal moire pattern the single bar then subtends half that angle, that is 1/1000.

As we have seen, however, a planoscope with grids of equal pitch produce moire bars subtending an angle of $s/2d$, independent from the observation distance. If we now consider, as an example, the planoscope type A above-mentioned, we find $s/2d \approx 1/200$. Consequently, the optimal moire pattern will be obtained when the foremost grid is seen under an angle of 1/110 which occurs already at a distance of 110×0.3=33 meters. This is less than a fourth of the maximum observation distance which in the above was supposed to be $500\times b$, that is 500×0.3=150 meters. In other words, though the size of the grids would still permit a perfect reading of the instrument from a distance of 150 meters, the moire pattern has long before become unsuitable since, from a distance of 66 meters on, the center moire bar alone fills the whole image.

Figure 11:
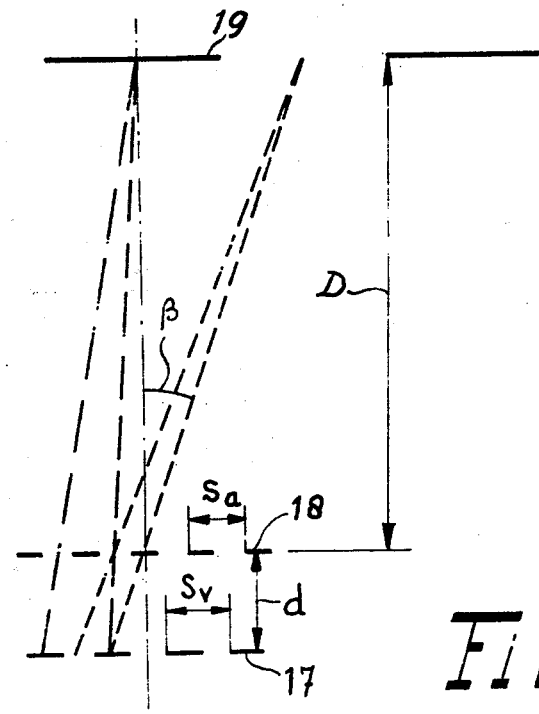
FIG. 11 is a cross-sectional view similar to FIG. 3, for a planoscope according to the invention.

According to the invention this difficulty can be avoided if the pitch of the foremost grid is made slightly greater than that of the rearmost grid, the grids being so positioned relative to each other that there is no phase shift at the place of the reference plane, or a phase shift of a half period. As will be explained in connection with FIG. 11 this results in the virtual moire image being transferred from infinity to a place at a finite distance behind the planoscope. Owing to this the apparent width of the moire bars will no longer be constant but will gradually decrease when the observer moves away from the planoscope.

In FIG. 11 it is again assumed for simplicity that the two grids 17 and 18 lie in parallel planes. The foremost grid 17 has a slightly greater pitch $s_r$ that the rearmost grid 18 ($s_a$), and the phase shift between the grids at the place of the reference plane is a half period, resulting in a dark center bar. The difference $\Delta s=s_r-s_a$ should be extremely small (preferably between 1/100 and 1/2000 of $s$) as will appear hereinafter. Also, $d$ has again been shown much smaller that it is in reality.

Under these conditions it will easily be seen that the virtual moire image 19, some bars of which have been shown, is formed at a distance $D$ behind the planoscope:

$$D = \frac{s}{\Delta s} d$$

wherein $s \approx s_a \approx s_r$, and that a moire bar, as seen from the planoscope, has an angular width:

$$\beta = \frac{s}{2d}$$

In FIG. 12 a planoscope 20 of that type is shown, together with its virtual moire image 21 at a distance $D$ behind it. Evidently, for an observer standing at point 22 the center bar of the pattern covers about half the width $b$ of the planoscope, this being the optimal situation for maximum viewing distance. If the observer approaches the planoscope the apparent width of the moire bars increases at a lower rate than the apparent width of the planoscope itself since the latter is closer to him.

For comparison FIG. 13 illustrates schematically the situation for a planoscope 23 with equal pitch in both grids. With $s$ and $d$ equal to FIG. 12 the angular width of the moire bars is now $s/2d$, independent from the observer's distance, which is equal to the width occuring in FIG. 12 at the minimum distance, that is immediately in front of the planoscope. These bars are schematically indicated by the black sectors. In point 24 already, at a relatively short distance from the planoscope, the optimal pattern for maximum observation distance is obtained. At double this distance the center bar fills the grid completely, so that further observation becomes impossible.

If we wish to use the zero order planoscope type A above mentioned at the maximum observation distance of 150 meters, it can be easily followed from the formulas given that the virtual moire image should be located about 42 meters behind the planoscope. Apparently to that end a difference in pitch $\Delta s$ must be applied, such that:

$$\frac{\Delta s}{s} = \frac{d}{D} = \frac{0.08}{42} \approx \frac{1}{500}$$

Since the number of lines in each grid of this planoscope is only about 410, the rearmost grid should in this case have less than one line more than the foremost grid.

It may be noted that not only the number of moire bars but also their shape changes somewhat compared with the case of equal pitches in both grids. Though they are still bounded by hyperbolas, as shown in FIGS. 4-9, these have no longer for asymptote the intersection line of the two grid planes. Owing to the difference in pitch the moire bars now extend up to the said intersection line. Along that line they have a finite width $s^2/2\Delta s$, instead of the infinite width in the case of grids having equal pitches. In the actually used image portion there is a less pronounced spreading of the moire bars toward the intersection line. Furthermore, when moving out of the reference plane, the moire pattern is not merely displaced parallel to itself, but the bars take a different inclination. This is so because the end of the moire bars is "attached" to the intersection line of the grid planes due to the fact that the apparent relative positions of the grid lines along the intersection line does not change with the direction of viewing. For the same reason the center bar becomes somewhat asymmetrical if seen from a point outside the reference plane, and this facilitates the finding of that plane. In FIG. 14 this effect is illustrated. The boundaries of the bar 26 have been extended by dotted lines up to the intersection line 25.

In the above it has been set forth that grids positioned under an angle generally produce moire patterns with bars of nonuniform width. However, the finding of the reference plane would be facilitated still more if, for a predetermined observation distance, particularly the maximum distance envisaged, the moire bars could be given a uniform width throughout their length.

According to the invention this can be achieved by slightly spreading the grid lines in one or both of the grids or, in other words, by applying a pitch which is slightly variable in the direction of the grid lines. This will be explained with reference to FIG. 15.

With grids placed at an angle the separation $d$ is variable. Consequently, the distance $D$ at which the virtual moire image is formed behind the planoscope, as well as the angle $\beta$ subtended by one bar of that image when seen from the planoscope, will also vary across the image height. In FIG. 15, 28 and 29 represent the center bars of the moire images corresponding to the extreme values $d_1$ and $d_2$, respectively, of the distance between the grids of planoscope 27. Further, let $s$ be the average pitch of the grids, and $\Delta s_1$ and $\Delta s_2$, respectively, the small differences in pitch between the foremost and rearmost grid occurring at the extreme distances $d_1$ and $d_2$. If one now wishes the moire bars 28 and 29 as seen from a point 30 at a distance $D_w$ from the planoscope to have equal angular widths, the following equation must be satisfied:

$$\frac{B_1}{D_w + D_1} = \frac{B_2}{D_w + D_2}$$

Herein $B_1 = \beta_1 D_1$ and $B_2 = \beta_2 D_2$ are the true widths of the two bars 28 and 29. Applying the formulas:

$$\beta_1 = \frac{s}{2d_1}; \quad D_1 = \frac{s}{\Delta s_1} \cdot d_1$$

$$\beta_2 = \frac{s}{2d_2}; \quad D_2 = \frac{s}{\Delta s_2} \cdot d_2$$

the condition for equal widths becomes:

$$\frac{d_1 - d_2}{D_w} = \frac{\Delta s_2 - \Delta s_1}{s}$$

For the above planoscope type A, width $d_1 = 120$ mm., $d_2 = 40$ mm. and an observation distance $D_w$ of 150 meters, this gives:

$$\frac{\Delta s_2 - \Delta s_1}{s} = \frac{1}{1875}$$

Since, as indicated before, the number of grid lines in this example is about 411, the required difference in number of lines between upper and lower edge of the spreading grid is less than one-fourth of a line. This demonstrates that the moire pattern is extremely sensitive for small variations of the pitch across the grid.

We claim:

1. Instrument for rendering to a distant observer a visual indication of the position of a point relative to a plane of reference established by the instrument, which instrument comprises two line grids positioned in intersecting planes perpendicular to the plane of reference, which grids are symmetrical with respect to the plane of reference and both have lines which are substantially parallel to the plane of reference, characterized in that the pitch of the line grids is so selected and the grids are so positioned relative to each other that the condition:

$$\frac{d_{max}}{s^2} < \frac{0.45}{\lambda_m} \qquad (I)$$

(or the set of conditions II)

$$\frac{d_{max}}{s^2} < \frac{n + 0.45}{\lambda_m}$$

$$\frac{d_{min}}{s^2} > \frac{n - 0.15}{\lambda_m} \qquad (II)$$

is satisfied, in which:

$d_{max}$ = the maximum distance between the grids taken in the direction perpendicular to the bisector plane of the grids;

$s$ = the pitch of the grids; and $\lambda m$ = the mean wave length of the light used.

2. Instrument as claimed in claim 1, wherein the pitch of the foremost grid is made slightly greater than that of the rearmost grid.

3. Instrument as claimed in claim 2, wherein the difference in pitch is between 1/2000 and 1/100 of the average value of the pitches of the grids.

4. Instrument as claimed in claim 2, wherein the grids are so positioned that there is no phase shift or a phase shift of a half period at the place of the reference plane.

5. Instrument as claimed in claim 2, wherein one or both of the grids have a pitch which varies in the direction of the grid lines, such that at a predetermined observation distance the moire bars have a substantially constant width through their length.

6. Instrument for rendering to a distant observer a visual indication of the position of a point relative to a plane of reference established by the instrument, which instrument comprises two line grids positioned in intersecting planes perpendicular to the plane of reference, which grids are symmetrical with respect to the plane of reference and both have lines which are substantially parallel to the plane of reference, characterized in that the pitch of the line grids is so selected and the grids are so positioned relative to each other that the condition:

$$\frac{d_{max}}{s^2} < \frac{n + 0.45}{\lambda_m}$$

$$\frac{d_{min}}{s^2} > \frac{n - 0.15}{\lambda_m}$$

is satisfied, in which:

$d_{max}$ = the maximum distance between the grids taken in the direction perpendicular to the bisector plane of the grids;

$d_{min}$ = the minimum distance between the grids taken in the same direction; $n$ = an integer, greater than zero;

$s$ = the pitch of the grids; and $\lambda_m$ = the mean wavelength of the light used.

7. Instrument for rendering to a distant observer a visual indication of the position of a point relative to a plane of reference established by the instrument, which instrument comprises two line grids positioned in intersecting planes perpendicular to the plane of reference, which grids are symmetrical with respect to the plane of reference and both have lines which are substantially parallel to the plane of reference, characterized in that the pitch of the line grids is so selected and the grids are so positioned relative to each other that the condition:

$$\frac{d_m}{s^2} < \frac{0.15}{\lambda_m}$$

is satisfied, in which:

$d_m$ = the average distance between the grids taken in the direction perpendicular to the bisector plane of the grids;

$s$ = the pitch of the grids; and $\lambda_m$ = the mean wavelength of the light used.

8. Instrument for rendering to a distant observer a visual indication of the position of a point relative to a plane of reference established by the instrument, which instrument comprises two line grids positioned in intersecting planes perpendicular to the plane of reference, which grids are symmetrical with respect to the plane of reference and both have lines which are substantially parallel to the plane of reference, characterized in that the pitch of the line grids is so selected and the grids are so positioned relative to each other that the condition:

$$\frac{n-0.05}{\lambda_m} < \frac{d_m}{s^2} < \frac{n+0.20}{\lambda_m}$$

is satisfied in which:

$d_m$ = the average distance between the grids measured in the direction perpendicular to the bisector plane of the grids;

$n$ = an integer, greater than zero;

$s$ = the pitch of the grids; and $\lambda_m$ = the mean wavelength of the light used.

9. Instrument as claimed in claim 6, wherein the pitch of the foremost grid is made slightly greater than that of the rearmost grid.

10. Instrument as claimed in claim 9, wherein the difference in pitch is between 1/2000 and 1/100 of the average value of the pitches of the grids.

11. Instrument as claimed in claim 9, wherein the grids are so positioned that there is no phase shift or a phase shift of a half period at the place of the reference plane.

12. Instrument as claimed in claim 9, wherein one or both of the grids have a patch which varies in the direction of the grid lines, such that at a predetermined observation distance the moire bars have a substantially constant width through their length.